United States Patent
Sato

(10) Patent No.: US 8,327,712 B2
(45) Date of Patent: Dec. 11, 2012

(54) SEMICONDUCTOR PRESSURE SENSOR HAVING SYMMETRICAL STRUCTURE, AND MANUFACTURING METHOD THEREOF

(75) Inventor: Kimitoshi Sato, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 566 days.

(21) Appl. No.: 12/542,960

(22) Filed: Aug. 18, 2009

(65) Prior Publication Data
US 2010/0218611 A1    Sep. 2, 2010

(30) Foreign Application Priority Data
Feb. 27, 2009    (JP) .................................. 2009-046456

(51) Int. Cl.
*G01L 19/04*    (2006.01)
(52) U.S. Cl. ..................... 73/708; 73/700; 73/715
(58) Field of Classification Search .................. None
See application file for complete search history.

(56) References Cited

U.S. PATENT DOCUMENTS

| | | | | |
|---|---|---|---|---|
| 6,422,088 | B1 * | 7/2002 | Oba et al. .......................... | 73/754 |
| 6,840,103 | B2 * | 1/2005 | Lee et al. .................... | 73/335.05 |
| 6,845,662 | B2 * | 1/2005 | Kawai et al. ................. | 73/204.26 |
| 6,941,815 | B2 * | 9/2005 | Onose et al. ..................... | 73/726 |

FOREIGN PATENT DOCUMENTS

| | | |
|---|---|---|
| JP | 60-030554 U | 3/1985 |
| JP | 60-259922 | 12/1985 |
| JP | 62-18072 | 1/1987 |
| JP | 63-42179 | 2/1988 |
| JP | 63-76484 | 4/1988 |
| JP | 63-178353 | 11/1988 |
| JP | 4-47244 | 2/1992 |
| JP | 10-267776 | 10/1998 |
| JP | 2003-332586 | 11/2003 |
| JP | 2004-257864 | 9/2004 |
| JP | 2006-47193 | 2/2006 |
| JP | 2007-147374 | 6/2007 |
| JP | 3941193 B2 | 7/2007 |

OTHER PUBLICATIONS

Office Action issued May 24, 2011 in China Application No. 200910222215.7 (With English Translation).
U.S. Appl. No. 12/846,072, filed Jul. 29, 2010, Sato.
U.S. Appl. No. 12/542,921, filed Aug. 18, 2009, Sato.

(Continued)

*Primary Examiner* — Lisa Caputo
*Assistant Examiner* — Jermaine Jenkins
(74) *Attorney, Agent, or Firm* — Oblon, Spivak, McClelland, Maier & Neustadt, L.L.P.

(57) ABSTRACT

A semiconductor pressure sensor includes a silicon substrate, an active gauge resistance forming portion having a first diaphragm and a first gauge resistance formed on the silicon substrate, and a dummy gauge resistance forming portion for temperature compensation having a second diaphragm and a second gauge resistance, formed on the substrate. The first diaphragm of the active gauge resistance forming portion and the second diaphragm of the dummy gauge resistance forming portion for temperature compensation are formed of a common polysilicon film. The polysilicon film has an anchor portion to be connected to the substrate. The first and second diaphragms have mutually identical or symmetrical structures and the first and second gauges have mutually identical or symmetrical structures. Accordingly, a semiconductor pressure sensor capable of highly accurate temperature compensation and manufacturing method thereof can be provided.

7 Claims, 15 Drawing Sheets

OTHER PUBLICATIONS

Office Action (Notice of Allowance) issued Nov. 30, 2011, in Korean Patent Application No. 10-2009-0084758 (with English-language translation).

Office Action mailed Aug. 21, 2012, in Japanese Patent Application No. 2009-046456, filed Feb. 27, 2009 (with English-language Translation), 5 pages.

\* cited by examiner

SEMICONDUCTOR PRESSURE SENSOR HAVING SYMMETRICAL STRUCTURE, AND MANUFACTURING METHOD THEREOF

BACKGROUND OF THE INVENTION

1. Field of the Invention

The present invention relates to a semiconductor pressure sensor and manufacturing method thereof and, more specifically, to a semiconductor pressure sensor capable of temperature compensation and manufacturing method thereof.

2. Description of the Background Art

In a conventional semiconductor pressure sensor, a diffusion resistance that will be a gauge resistance, is formed in a silicon substrate. A plurality of gauge resistances are bridge-connected by diffusion interconnections of low resistance. A diaphragm is formed by etching from a rear surface of the silicon substrate. Gauge resistances are arranged at an edge portion of the diaphragm.

By way of example, Japanese Utility Model Laying-Open No. 63-178353 describes a semiconductor pressure sensor having a diaphragm formed of an oxide film, a polysilicon substrate, an oxide film and a gauge, formed on a silicon substrate with a through hole.

Further, Japanese Patent Laying-Open No. 63-042179 describes a semiconductor strain detector having a semiconductor strain gauge formed on a semi-insulating polysilicon substrate having a thin portion as a diaphragm.

Further, Japanese Patent Laying-Open No. 60-259922 describes formation of a temperature-sensitive resistor formed of the same material as a strain-sensitive resistor, at a portion free from any strain on the diaphragm in a temperature-compensated strain sensor.

In a semiconductor pressure sensor, a gauge resistance is formed on a diaphragm. When pressure is applied to the semiconductor pressure sensor, the diaphragm deforms, and resistance value of gauge resistance changes. By detecting the change in resistance value of the gauge resistance, change in pressure can be measured. Further, in the semiconductor pressure sensor, the resistance value of gauge resistance formed on the diaphragm is influenced by the temperature at the time of pressure measurement. Therefore, for accurate pressure measurement, it is desirable to eliminate temperature dependency of semiconductor pressure sensor by temperature compensation.

In the strain sensor described in Japanese Patent Laying-Open No. 60-259922, the temperature-sensitive resistor is simply provided separate from the strain-sensitive resistor at a portion free from strain on the diaphragm and, therefore, accurate temperature compensation is difficult.

SUMMARY OF THE INVENTION

The present invention was made in view of the foregoing and its object is to provide a semiconductor pressure sensor capable of highly accurate temperature compensation and manufacturing method thereof.

The present invention provides a semiconductor pressure sensor, including: a substrate; an active gauge resistance forming portion having a first diaphragm and a first gauge resistance formed on the substrate; and a dummy gauge resistance forming portion for temperature compensation having a second diaphragm and a second gauge resistance formed on the substrate. The first diaphragm of the active gauge resistance forming portion and the second diaphragm of the dummy gauge resistance forming portion for temperature compensation are formed of a prescribed common film. The prescribed film has an anchor portion extending to the substrate to be connected to the substrate. The first and second diaphragms have mutually identical or symmetrical structures, and the first and second gauge resistances have mutually identical or symmetrical structures.

According to the semiconductor pressure sensor of the present invention, the first and second diaphragms have mutually identical or symmetrical structures, and the first and second gauge resistances have mutually identical or symmetrical structures. Therefore, it becomes possible to remove the change in resistance value caused by temperature measured by the second gauge resistance from the change in resistance value caused by temperature and pressure measured by the first gauge resistance. As a result, highly accurate temperature compensation can be attained by the semiconductor pressure sensor of the present invention.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the figures.

(Embodiment 1)

First, a structure of the semiconductor pressure sensor in accordance with Embodiment 1 of the present invention will be described.

Figure 1:
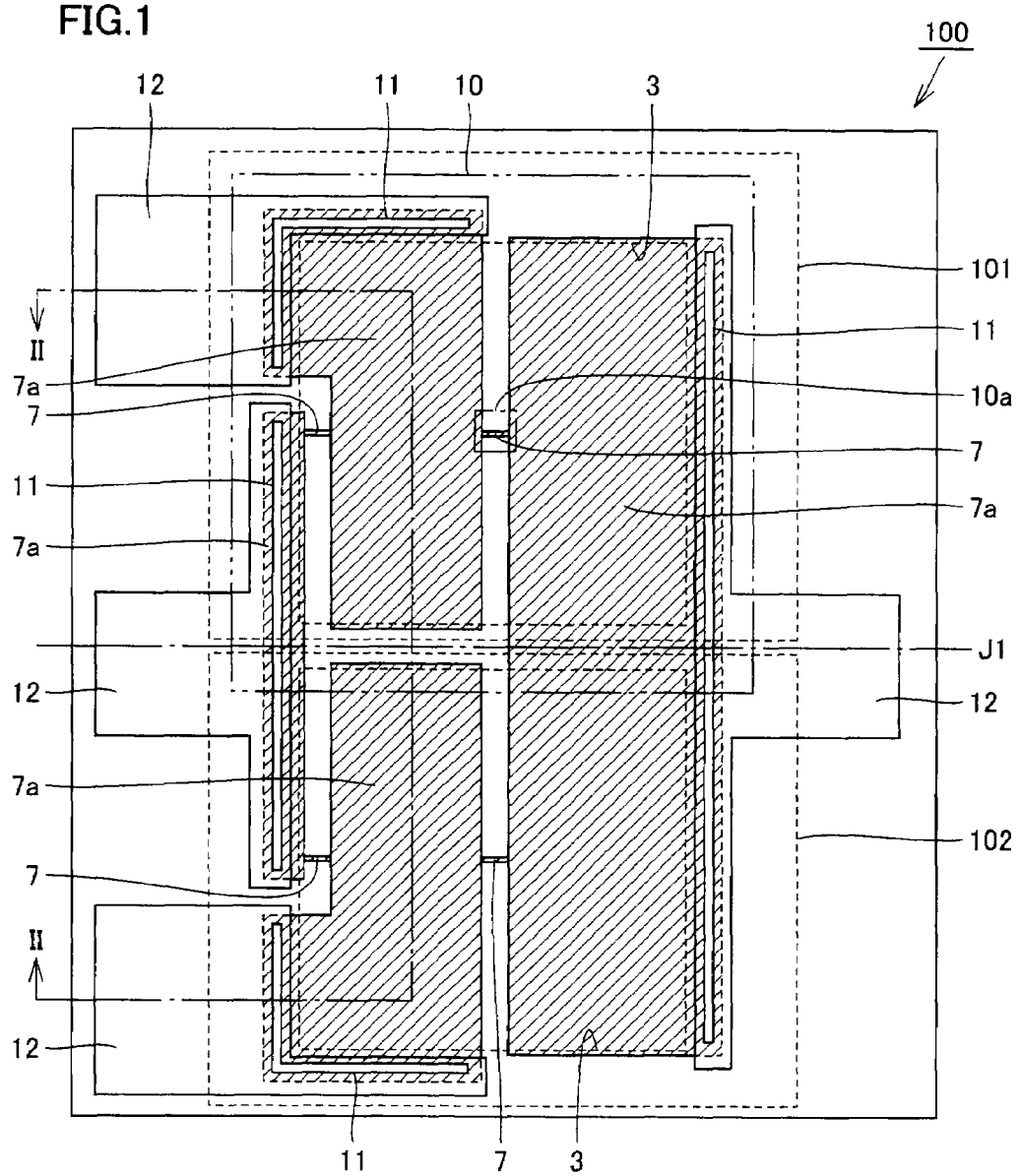
FIG. 1 is a schematic plan view of a semiconductor pressure sensor in accordance with Embodiment 1 of the present invention.
Figure 2:
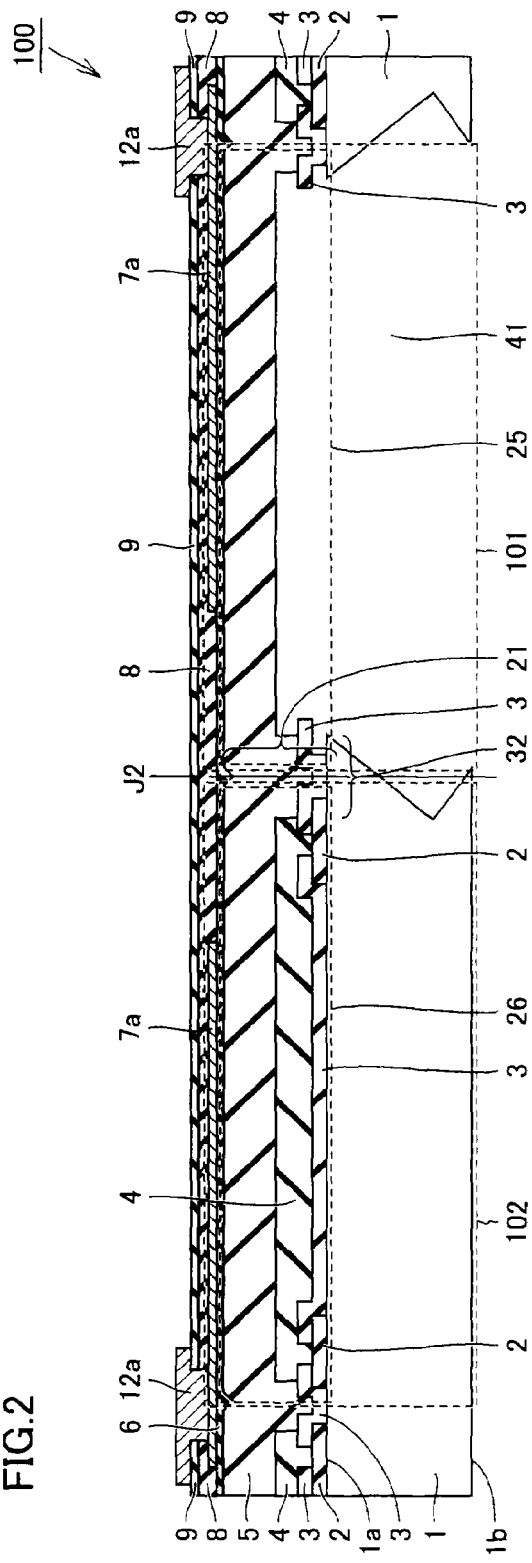
FIG. 2 is a schematic cross-sectional view taken along the line II-II of FIG. 1 of the semiconductor pressure sensor in accordance with Embodiment 1 of the present invention.

Referring to FIGS. 1 and 2, a semiconductor pressure sensor 100 mainly has an active gauge resistance forming portion 101 and a dummy gauge resistance forming portion 102 for temperature compensation. Active gauge resistance forming portion 101 and dummy gauge resistance forming portion 102 for temperature compensation are connected by a polycrystalline silicon (hereinafter referred to as "polysilicon") interconnection 7a. In active gauge resistance forming portion 101 shown in FIG. 1, a diaphragm etching mask 10 and a diaphragm bottom surface 10a are drawn, for convenience of later description of the manufacturing method.

Active gauge resistance forming portion 101 mainly has a silicon substrate (substrate) 1, a first diaphragm 25, a gauge resistance 7, and an aluminum pad 12.

On a first main surface 1a of silicon substrate 1, a first diaphragm 25 of polysilicon film 5 is formed. In the present embodiment, polysilicon film 5 is formed of a doped polysilicon (polycrystalline silicon doped with an impurity). Polysilicon film 5 may be formed of a non-doped polysilicon not doped with any impurity.

On an upper surface of first diaphragm 25, two gauge resistances 7 are formed, which detect strain of the first diaphragm 25 as a change in electric resistance. At a portion of silicon substrate 1 where the first diaphragm 25 is positioned, a through hole 41 is formed that exposes a rear surface of first diaphragm 25. Between the first diaphragm 25 and silicon substrate 1, an anchor portion 21 is formed to surround an opening end of through hole 41 on the side of the first main surface 1a from circumferential direction, for fixing the first diaphragm 25 on silicon substrate 1.

Anchor portion 21 is formed to encompass a portion of a sacrificial film 3 of polysilicon filling an opening of a first insulating film 2 and a portion of polysilicon film 5 filling an opening 32 of a second insulating film 4, extending from the first diaphragm 25 to silicon substrate 1.

Two gauge resistances 7 are formed of polysilicon films, on polysilicon film 5 to be the first diaphragm 25, with a third insulating film 6 interposed. Gauge resistances 7 are bridge-connected by a polysilicon interconnection 7a formed of the same polysilicon film as that forming gauge resistances 7. A fourth insulating film 8 is formed to cover gauge resistances 7 and polysilicon interconnection 7a.

In a region above the fourth and fifth insulating films 8 and 9, a plurality of aluminum pads 12 are formed. Each aluminum pad 12 is electrically connected to an aluminum interconnection 12a. Each aluminum pad 12 is electrically connected to polysilicon interconnection 7a through a contact portion 11.

Dummy gauge resistance forming portion 102 for temperature compensation mainly has silicon substrate 1, a second diaphragm 26, gauge resistances 7, and aluminum pads 12.

On the first main surface 1a of silicon substrate 1, the second diaphragm 26 of polysilicon film 5 is formed. On an upper surface of second diaphragm 26, two gauge resistances 7 are formed, which detect strain of the second diaphragm 26 as a change in electric resistance.

Between the second diaphragm 26 and silicon substrate 1, first insulating film 2, polysilicon sacrificial film 3 and second insulating film 4 are stacked. The first insulating film 2 is formed, for example, of a thermally oxidized film. The second insulating film 4 is formed, for example, of TEOS (Tetraethoxysilane).

Between the second diaphragm 26 and silicon substrate 1, an anchor portion 21 is formed to surround first insulating film 2, polysilicon sacrificial film 3 and second insulating film 4 from circumferential direction, for fixing the second diaphragm 26 on silicon substrate 1.

Anchor portion 21 is formed to encompass a portion of polysilicon sacrificial film 3 filling an opening of first insulating film 2 and a portion of polysilicon film 5 filling an opening 32 of second insulating film 4, extending from the second diaphragm 26 to silicon substrate 1.

Two gauge resistances 7 are formed of polysilicon films, on polysilicon film 5 to be the second diaphragm 26, with a third insulating film 6 interposed. The third insulating film 6 is formed, for example, of a silicon oxide film (HTO: High Temperature Oxide).

Gauge resistances 7 are bridge-connected by a polysilicon interconnection 7a formed of the same polysilicon film as that forming gauge resistances 7. A fourth insulating film 8 is formed to cover gauge resistances 7 and polysilicon interconnection 7a.

In a region above the fourth and fifth insulating films 8 and 9, a plurality of aluminum pads 12 are formed. Each aluminum pad 12 is electrically connected to an aluminum interconnection 12a. Each aluminum pad 12 is electrically connected to polysilicon interconnection 7a through a contact portion 11.

At active gauge resistance forming portion 101 and dummy gauge resistance forming portion 102 for temperature compensation, the first and second diaphragms 25 and 26 are formed of common polysilicon film 5.

The first and second diaphragms 25 and 26 as well as the first and second gauge resistances 7 at active gauge resistance forming portion 101 and dummy gauge resistance forming portion 102 for temperature compensation have symmetrical shapes both in the plan view (FIG. 1) and in the cross-sectional view (FIG. 2).

Specifically, as shown in FIG. 1, the first diaphragm 25 at active gauge resistance forming portion 101 and the second diaphragm 26 at dummy gauge resistance forming portion 102 for temperature compensation have structures substantially in line-symmetry with respect to a phantom axial line J1 in the plan view. The phantom axial line J1 is positioned at the central portion of anchor portion 21, which is positioned between the first and second diaphragms 25 and 26 in the plan view. Similarly, the first and second gauge resistances 7 have structures substantially in line symmetry with respect to the phantom axial line J1 in the plan view.

Further, as shown in FIG. 2, the first and second diaphragms 25 and 26 have structures substantially in line symmetry with respect to the phantom axial line J2 in the cross-sectional view. The phantom axial line J2 is positioned at the central portion of anchor portion 21 positioned between the first and second diaphragms 25 and 26 in the cross-sectional view. Similarly, the first and second gauge resistances 7 have structures substantially in line symmetry with respect to the phantom axial line J2 in the cross-sectional view.

Anchor portion 21 is formed of common polysilicon film 5 extending to silicon substrate 1 to be connected to silicon substrate 1.

At active gauge resistance forming portion 101, silicon substrate 1, first insulating film 2, polysilicon sacrificial film 3 and second insulating film 4 below polysilicon film 5 are removed by etching, whereby the first diaphragm 25 is formed. Because of such a structure, pressure change on the first diaphragm 25 leads to a change in resistance value of the first gauge resistance 7.

At dummy gauge resistance forming portion 102 for temperature compensation, the second insulating film 4 and the like below polysilicon film 5 are not etched away. Specifically, the second diaphragm 26 is formed without any space formed below polysilicon film 5. Because of such a structure, pressure change on the second diaphragm 26 hardly leads to any change in resistance value of the second gauge resistance 7. Namely, resistance value of second gauge resistance 7 changes in response to temperature change.

As shown in FIG. 1, the two gauge resistances 7 formed at active gauge resistance forming portion 101 and the two gauge resistances 7 formed at dummy gauge resistance forming portion 102 for temperature compensation are bridge-connected by means of polysilicon interconnection 7a. Therefore, when the first diaphragm 25 of active gauge resistance forming portion 101 deforms by the pressure, resistance value of gauge resistance 7 changes and an output voltage in accordance with the pressure generates. Further, change in resistance value caused by temperature change in gauge resistance 7 at dummy gauge resistance forming portion 102 for temperature compensation is subtracted by the bridge circuit from the change in resistance value caused by the pressure change and temperature change in gauge resistance 7 at active gauge resistance forming portion 101, whereby influence of strain caused by temperature change is compensated. In this manner, temperature dependency of semiconductor pressure sensor 100 can be eliminated.

Figure 8:
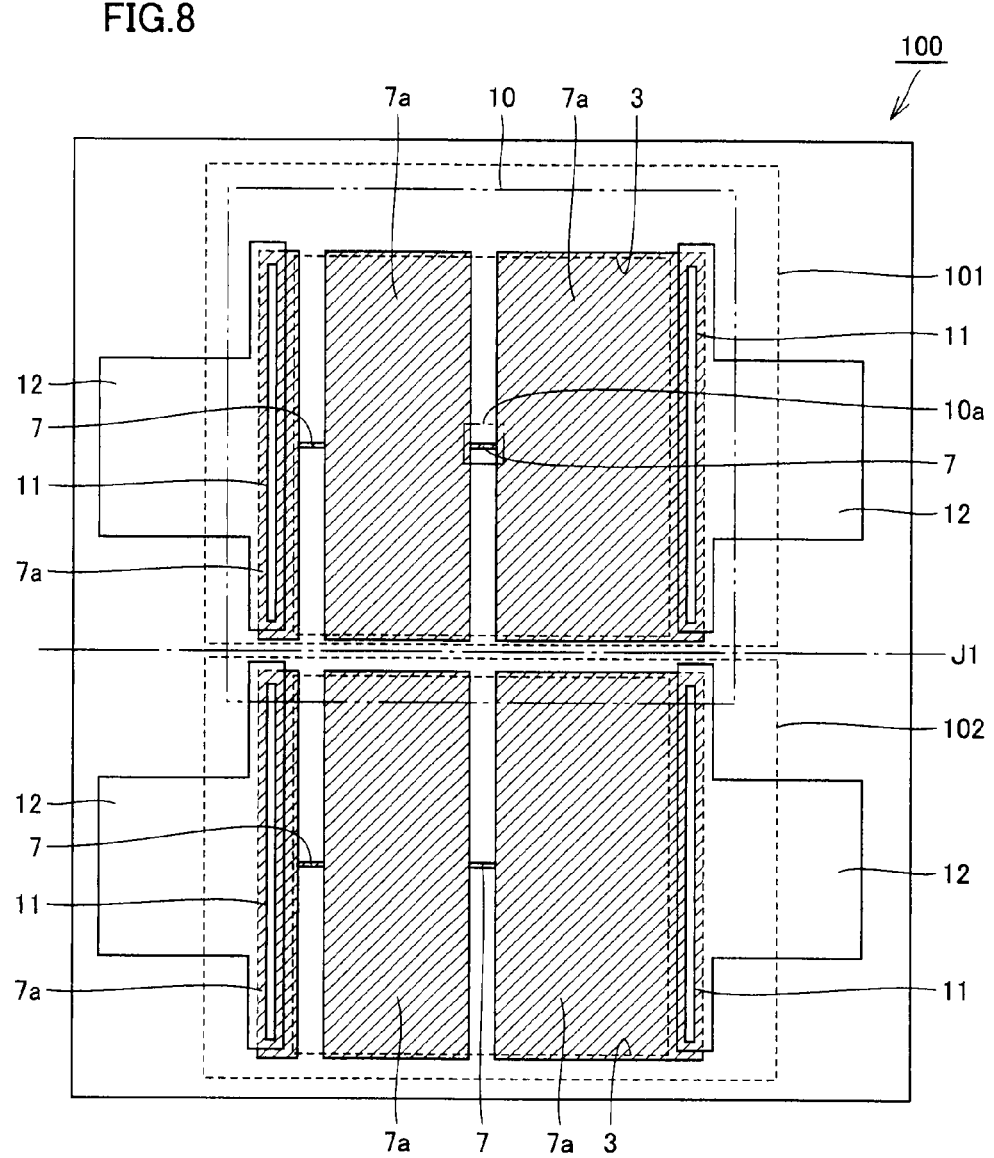
FIG. 8 is a schematic plan view showing a modification of the semiconductor pressure sensor in accordance with Embodiment 1 of the present invention.

In the foregoing, active gauge resistance forming portion 101 and dummy gauge resistance forming portion 102 for temperature compensation are connected by aluminum interconnection 12a. As shown in FIG. 8, aluminum pads 12 may be connected directly to each of active gauge resistance forming portion 101 and dummy gauge resistance forming portion 102 for temperature compensation. At thin portions of first and second diaphragms 25 and 26 and of silicon substrate 1, characteristics may be deteriorated by the influence of stress on aluminum. Use of aluminum pads 12 of smaller area reduces such deteriorating influence of stress on aluminum.

Though an example in which the first and second diaphragms 25 and 26 have linearly symmetrical structures and first and second gauge resistances 7 have linearly symmetrical structures has been described in the foregoing, the structures are not limited to linear symmetry, and structures in point symmetry are also possible. Further, identical structures such as shown in FIG. 8 are also available.

Though an example in which active gauge resistance forming portion 101 and dummy gauge resistance forming portion 102 for temperature compensation have linearly symmetrical structures has been described, the structures are not limited to linear symmetry, and structures in point symmetry are also possible. Further, identical structures such as shown in FIG. 8 are also available.

In the following, a method of manufacturing the semiconductor pressure sensor in accordance with the present embodiment will be described.

Figure 3:
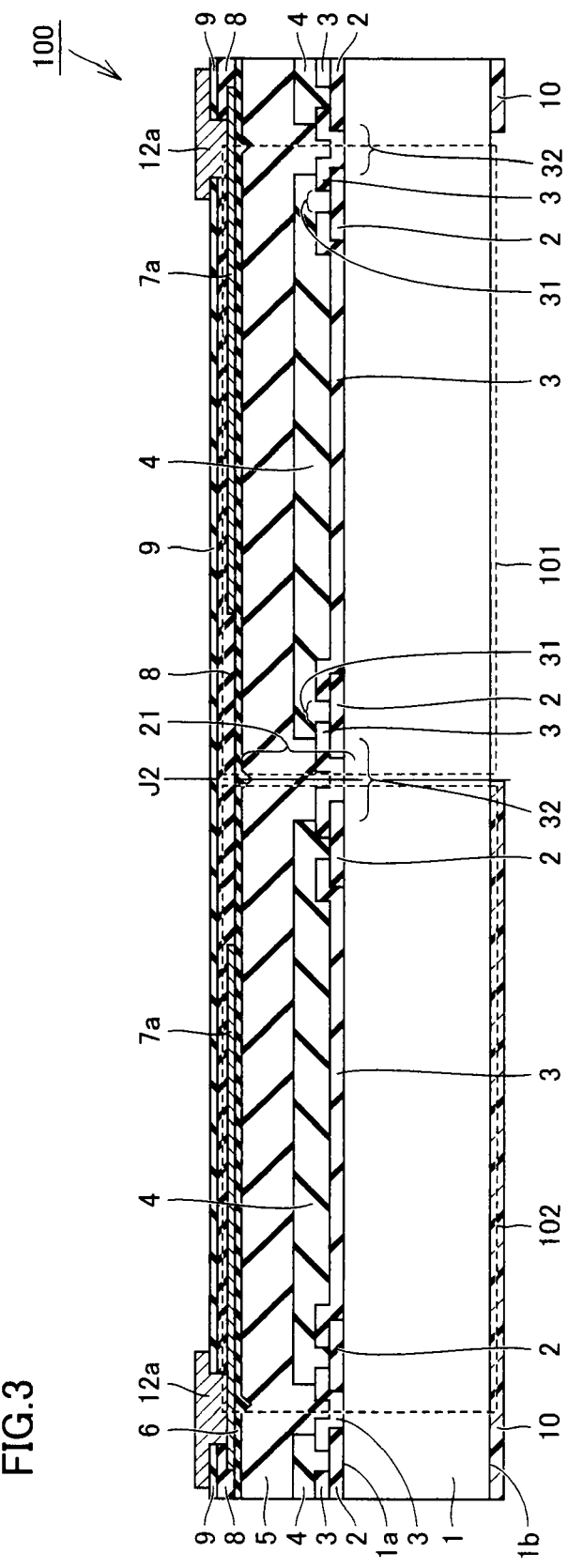
FIGS. 3 to 6 are schematic cross-sectional views showing in order the steps of manufacturing the semiconductor pressure sensor in accordance with Embodiment 1 of the present invention.

Referring to FIG. 3, a substrate 1 having first and second main surfaces 1a and 1b opposite to each other is prepared. A silicon substrate 1 of which second main surface 1b has crystal orientation of (100) is used. On silicon substrate 1, a first insulating film 2 is formed, for example, by a thermally oxidized film. Openings are formed by etching in first insulating film 2 at positions where the first and second diaphragms 25 and 26 (FIG. 2) and anchor portion 21 are to be formed.

Thereafter, to fill the openings, polysilicon sacrificial film 3 is formed, for example, by doped polysilicon, on the first insulating film 2.

Figure 4:
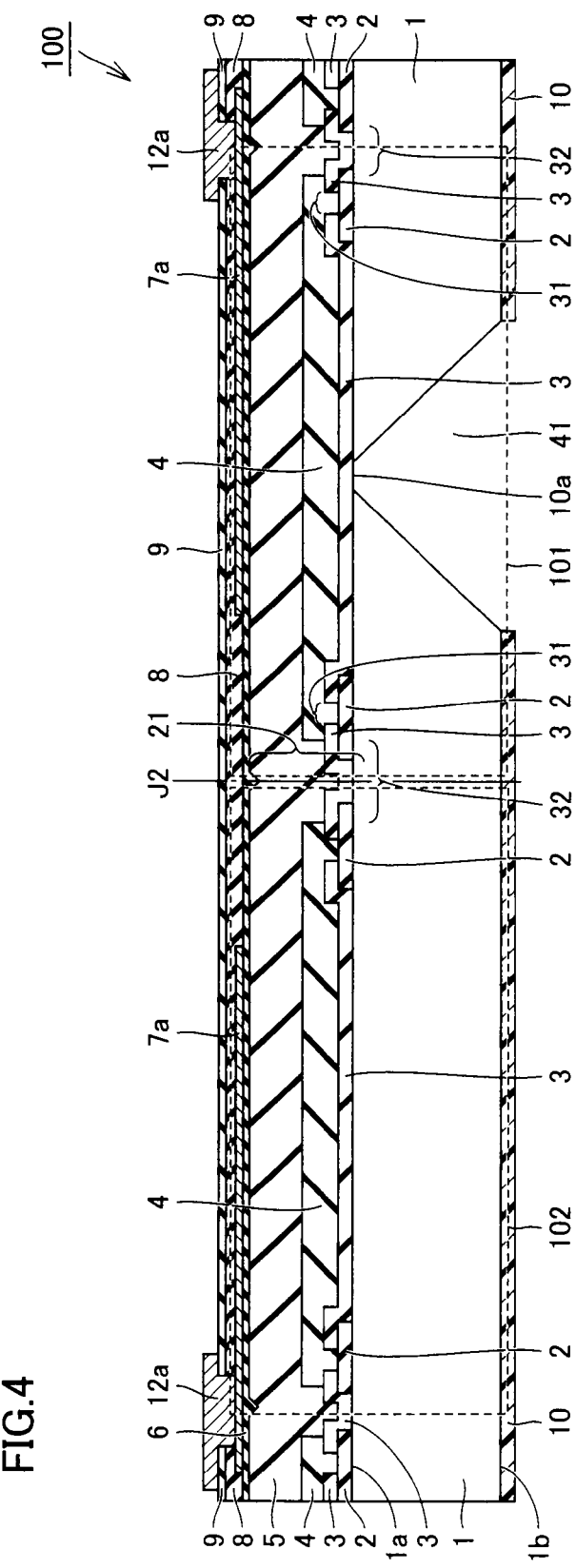

Referring to FIG. 4, an opening 31 is formed in polysilicon sacrificial film 3 to surround a bottom surface 10a of the diaphragm. Diaphragm bottom surface 10a represents the shape of polysilicon sacrificial film 3 opened immediately after through hole 41 reached the polysilicon sacrificial film 3 as a result of silicon etching from the second main surface 1b.

Next, the second insulating film 4 is formed, for example, by TEOS. The second insulating film 4 is in contact with the first insulating film 2 at opening 31, and it serves as an etch stopper when the first and second insulating films 2 and 4 are silicon-etched from the second main surface 1b. In the second insulating film 4, an opening 32 is formed to surround the first and second diaphragms 25 and 26 (FIG. 2), based on the area for forming anchor portion 21. Further, the size of first and second diaphragms 25 and 26 (FIG. 2) is determined by polysilicon sacrificial film 3 and the second insulating film 4. In this manner, opening 32 exposing the first main surface 1a of silicon substrate 1 is formed in the first insulating film 2, to surround from circumferential direction a prescribed region where the first and second diaphragms 25 and 26 (FIG. 2) and anchor portion 21 are to be formed.

Thereafter, polysilicon film 5 to be the both diaphragms in active gauge resistance forming portion 101 and dummy gauge resistance forming portion 102 for temperature compensation is formed, for example, of a doped polysilicon film. By stress control, polysilicon film 5 is formed to have a flat surface when stress is released. In this manner, polysilicon film 5 to be the first and second diaphragms 25 and 26 (FIG. 2) is filled in opening 32 of the second insulating film 4 to be connected to a portion of polysilicon sacrificial film 3, and a portion of polysilicon sacrificial film 3 is filled in the first insulating film 2 to be connected to silicon substrate 1, whereby anchor portion 21 is formed.

Next, on polysilicon film 5 to be the first and second diaphragms 25 and 26 (FIG. 2), a third insulating film 6 of, for example, HTO is deposited by CVD (Chemical Vapor Deposition).

Next, polysilicon interconnection 7a and gauge resistance 7 (FIG. 1) are formed at proscribed positions on the third insulating film 6. Polysilicon interconnection 7a and gauge resistance 7 are formed, for example, by introducing an impurity such as B (boron) to an undoped polysilicon film.

Thereafter, the fourth insulating film 8 is formed to cover polysilicon interconnection 7a. Then, the fifth insulating film 9 is formed. Then, aluminum interconnection 12a is formed. Thus, the pattern on the side of first main surface 1a is complete.

Next, the second main surface of silicon substrate 1 is subjected to grinding, to be a thin film of about 200 μm. Thereafter, as shown in FIG. 3, a prescribed diaphragm etching mask 10 is formed on a region of second main surface 1b of silicon substrate 1. Diaphragm etching mask 10 is formed in consideration of overlay error, side-etching amount during silicon etching. Specifically, diaphragm etching mask 10 is formed such that when silicon substrate 1 is etched and through hole 41 reaches polysilicon sacrificial film 3, diaphragm bottom surface 10a does not abut polysilicon sacrificial film 3 at dummy gauge resistance forming portion 102 for temperature compensation.

Figure 7:
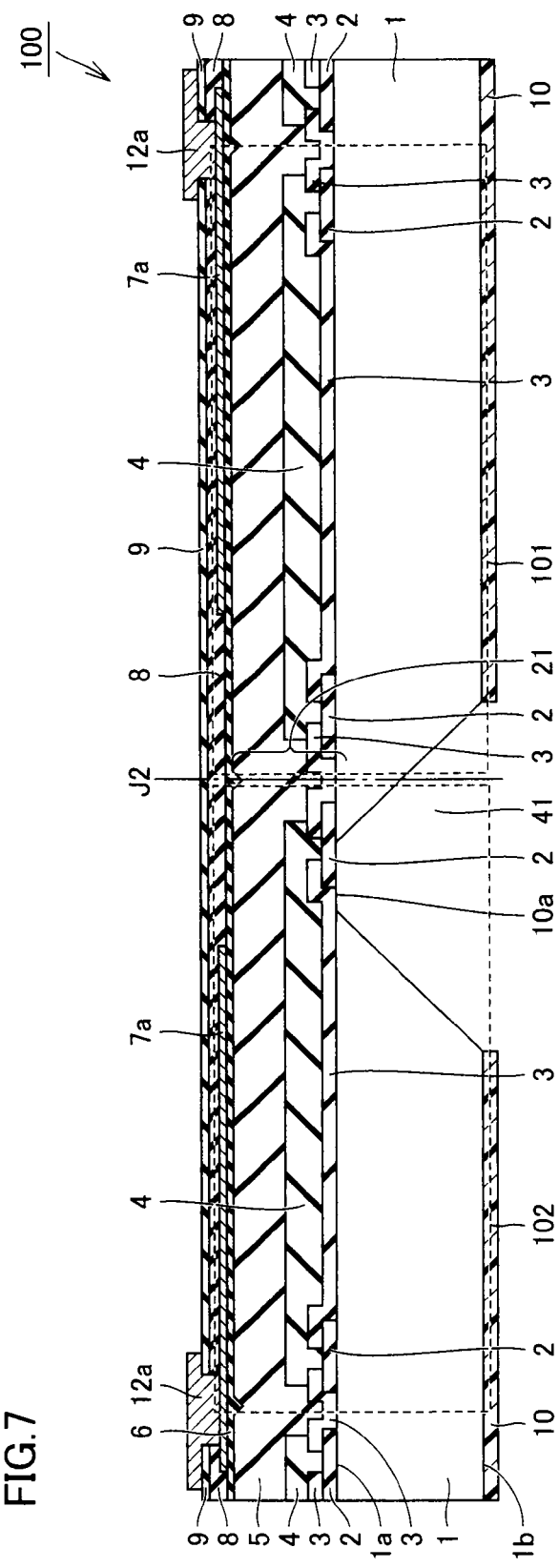
FIG. 7 is a schematic cross-sectional view showing a state in which an etching mask is not correctly formed, in the method of manufacturing the semiconductor pressure sensor.

Further, diaphragm etching mask 10 is formed such that diaphragm bottom surface 10a is not out of polysilicon sacrificial film 3 at active gauge resistance forming portion 101. Specifically, referring to FIG. 7, if overlay error should occur in photolithography, polysilicon sacrificial film 3 at dummy gauge resistance forming portion 102 for temperature compensation would be etched. In such a case, dummy gauge resistance forming portion 102 for temperature compensation comes to be influenced by the pressure change, and accurate temperature compensation becomes impossible.

Figure 5:
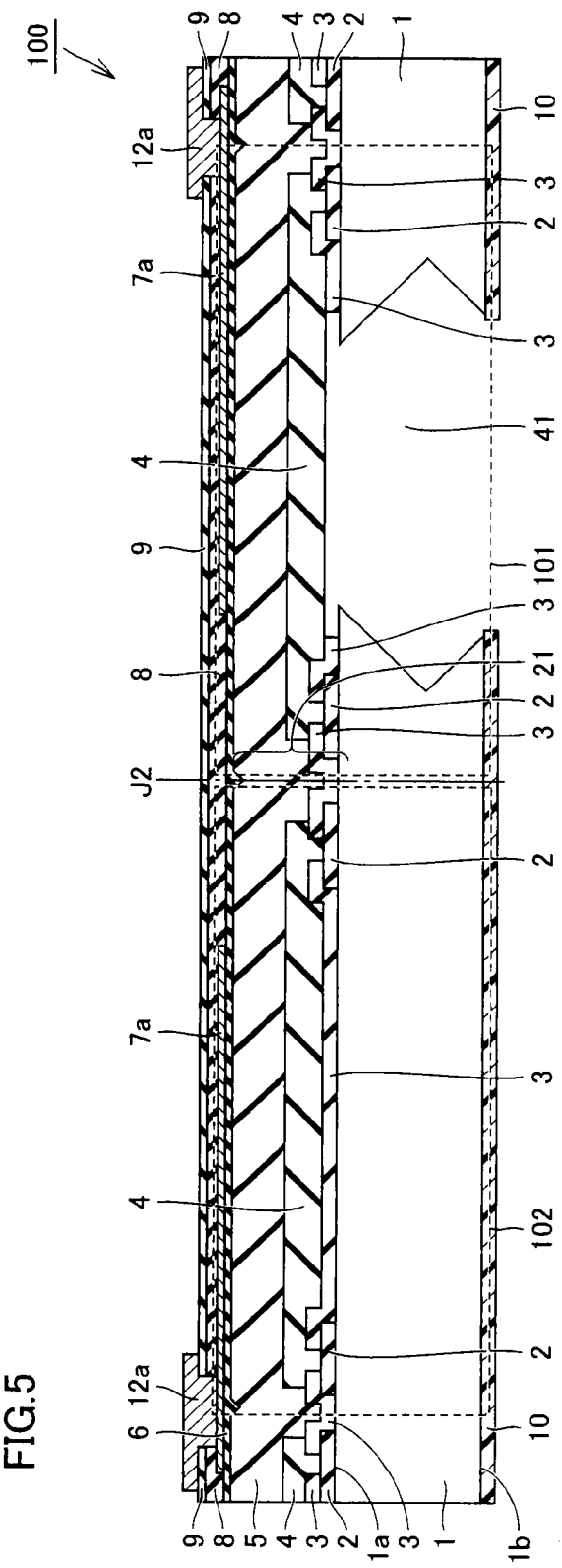
Figure 6:
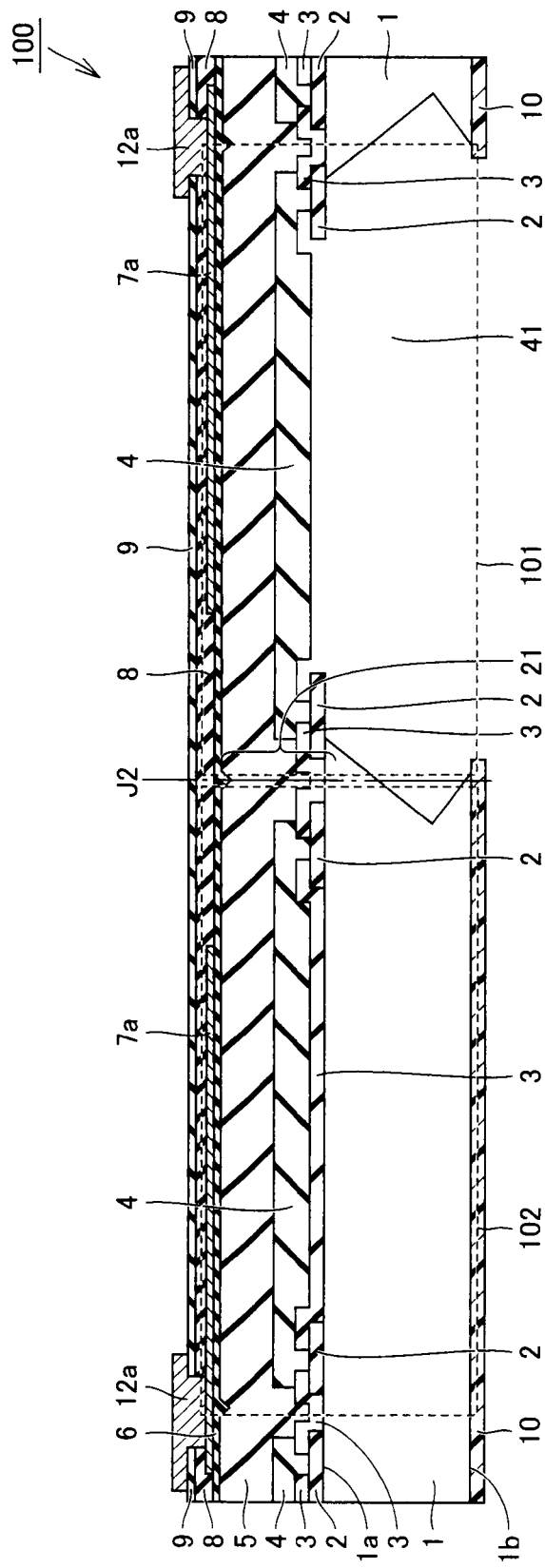

Next, as shown in FIG. 4, silicon substrate 1 is etched using diaphragm etching mask 10. As shown in FIG. 5, after formation of diaphragm bottom surface 10a, etching is continued and silicon substrate 1 and polysilicon sacrificial film 3 are side-etched. When etching is further continued, through hole 41 formed in silicon substrate 1 becomes larger, as shown in FIG. 6.

Silicon substrate 1 is etched using an alkali etchant such as TMAH (Tetramethyl ammonium hydroxide). Etching is continued until polysilicon sacrificial film 3 is entirely removed. The second insulating film 4 serves as etch stopper. Thus, through hole 41 is formed with the surface of a portion of second insulating film 4 exposed. If silicon etching is done using TMAH and second insulating film is formed of an oxide film such as TEOS, sufficient etch selectivity can be attained, which facilitates formation of the first diaphragm 25.

Finally, the second insulating film 4 and diaphragm etching mask 10 are removed by HF (hydrogen fluoride), whereby portions of first and second insulating films 2 and 4 positioned at a prescribed region, where the first diaphragm 25 is to be formed, are removed. Polysilicon film 5 to be the first diaphragm 25 is exposed through the through hole 41, and thus, first diaphragm 25 at active gauge resistance forming portion 101 is formed.

Next, functions and effects of the present embodiment will be described.

According to the present embodiment, when there is a pressure change on the first diaphragm 25, resistance value of first gauge resistance 7 changes. The resistance value of first gauge resistance 7 also changes dependent on temperature. Therefore, by the first diaphragm 25 by itself, it is difficult to measure the change in resistance value derived solely from pressure change on the first gauge resistance 7. On the other hand, the second diaphragm 26 does not have any space below polysilicon film 5 and, therefore, resistance value of second gauge resistance 7 hardly changes even when pressure changes. Resistance value of second gauge resistance 7 changes in response to temperature change.

In the present embodiment, the first and second diaphragms 25 and 26 have the identical or symmetrical structures, and the first and second gauge resistances 7 have the identical or symmetrical structures. Therefore, the change in resistance value of first gauge resistance 7 caused by temperature change of first diaphragm 25 can be measured using the second diaphragm 26.

Therefore, from the change in resistance value derived from pressure and temperature measured by the first gauge resistance 7, the change in resistance value derived from temperature measured by the second gauge resistance 7 can be subtracted. This realizes highly accurate temperature compensation of semiconductor pressure sensor 100. Therefore, semiconductor pressure sensor 100 can accurately measure the change caused by pressure.

Further, active gauge resistance forming portion 101 for measuring pressure includes, in addition to the first diaphragm 25 and first gauge resistance 7, polysilicon interconnection 7a, contact portion 11, etc. Further, dummy gauge resistance forming portion 102 for temperature compensation includes, in addition to the second diaphragm 26 and second gauge resistance 7, polysilicon interconnection 7b, contact portion 11, etc. Since active gauge resistance forming portion 101 and dummy gauge resistance forming portion 102 for temperature compensation are formed to have mutually identical or symmetrical structures, influence of temperature characteristics not only on the first and second diaphragms 25 and 26 and first and second gauge resistances 7 but also on the polysilicon interconnections 7a and contact portions 11 can be compensated. Further, patterning becomes easier and, hence, productivity can be improved.

By the bridge connection between active gauge resistance forming portion 101 and dummy gauge resistance forming portion 102 for temperature compensation, temperature dependency of semiconductor pressure sensor 100 can be eliminated.

Further, as the first diaphragm 25 of active gauge resistance forming portion 101 and the second diaphragm 26 of dummy gauge resistance forming portion 102 for temperature compensation have common anchor portion 21, semiconductor pressure sensor 100 can be reduced in size.

Next, functions and effects of the present embodiment will be described in comparison with a comparative example.

In a common semiconductor pressure sensor, there is a overlay error of about 10 μm between a gauge resistance on a front surface side and a diaphragm etching mask on a rear surface side. Further, there is a variation of about 10 μm in the amount of side etching in diaphragm etching. Because of the error and variation mentioned above, it is difficult to reduce the size of common semiconductor pressure sensor. In a common semiconductor pressure sensor, diaphragm thickness is adjusted by controlling etching time. Such control leads to lower operating efficiency and insufficient accuracy. Further, it is difficult to make thinner the diaphragm in consideration of variation in wafer thickness after grinding and variation in etch amount of wafer surface.

In contrast, according to the present embodiment, polysilicon sacrificial film 3 is etched and thereby first and second diaphragms 25 and 26 are formed, which are in contact with substrate 1 through anchor portion 21. Therefore, area of first and second diaphragms 25 and 26 is determined by anchor portion 21 formed at an outer periphery of first and second diaphragms 25 and 26.

Further, thickness of first and second diaphragms 25 and 26 is determined by the thickness of polysilicon film 5 and the height of anchor portion 21 from silicon substrate 1 after etching of polysilicon sacrificial film 3. Positions where anchor portion 21 and gauge resistances 7 are formed are determined by accuracy of photolithography on the side of first main surface 1a.

Specifically, the area, thickness and positions of first and second diaphragms 25 and 26 can be adjusted by controlling film formation accuracy of polysilicon sacrificial film 3a and polysilicon film 5 on the side of first main surface 1a of silicon substrate 1, accuracy of processing including photolithography, and registration accuracy between gauge resistances 7 and anchor portion 21. As a result, it becomes possible to accurately support the first and second diaphragms 25 and 26 by anchor portion 21. Therefore, a highly accurate and compact semiconductor pressure sensor can be provided.

(Embodiment 2)

Embodiment 2 of the present invention differs from Embodiment 1 mainly in the manner of etching silicon substrate 1.

Figure 9:
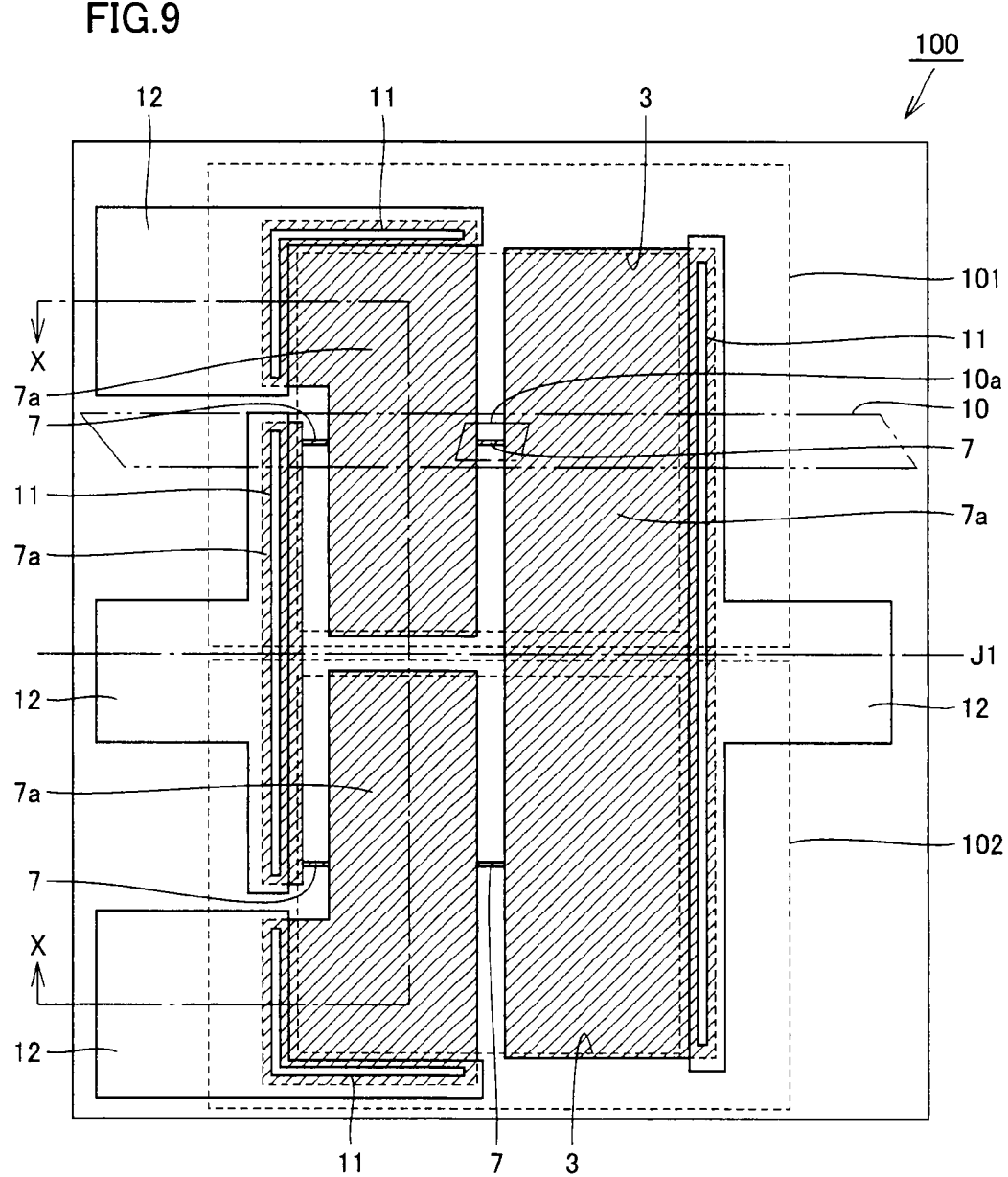
FIG. 9 is a schematic plan view of a semiconductor pressure sensor in accordance with Embodiment 2 of the present invention.

Referring to FIG. 9, as compared with Embodiment 1, diaphragm etching mask 10 has an elongate shape along the longitudinal direction of gauge resistance 7 in the plan view. Further, diaphragm bottom surface 10a has a shape of a parallelogram in the plan view.

Figure 10:
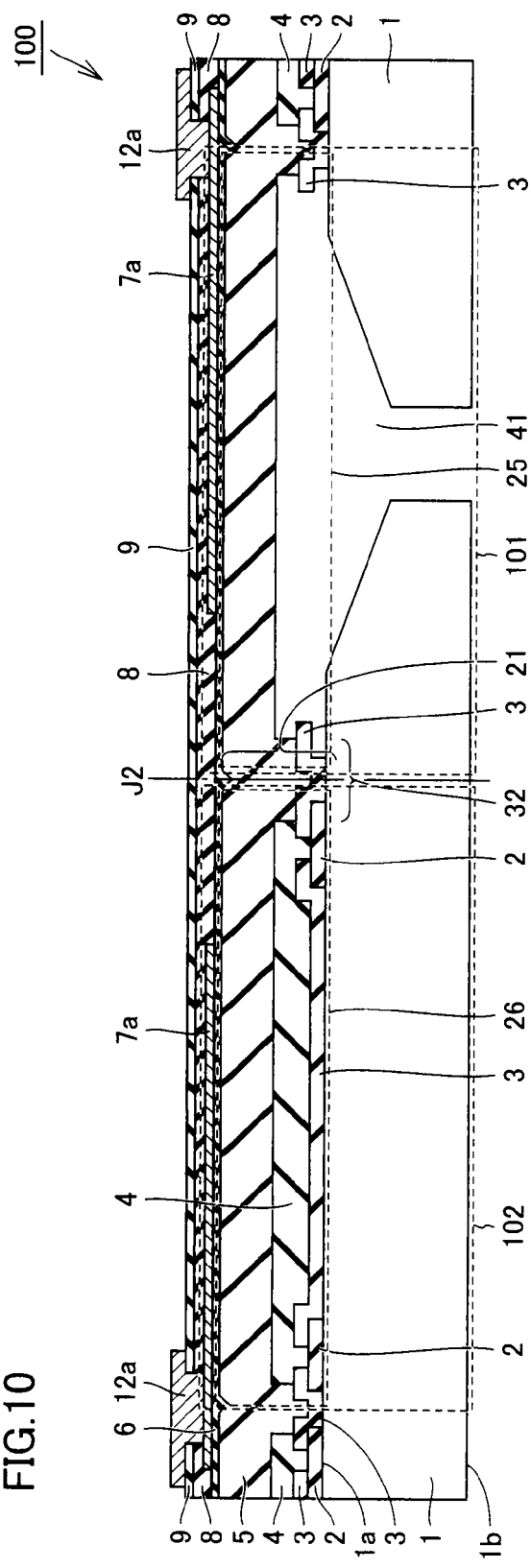
FIG. 10 is a schematic cross-sectional view of the semiconductor pressure sensor in accordance with Embodiment 2 of the present invention.

Referring to FIG. 10, through hole 41 formed in silicon substrate 1 to extend from the second main surface 1b to the first main surface 1a, extends substantially vertically to a middle portion between the second main surface 1b and the first main surface 1a from the second main surface 1b. Through hole 41 is formed to be gradually wider from the middle portion between the second main surface 1b and the first main surface 1a to the first main surface 1a.

Figure 11:
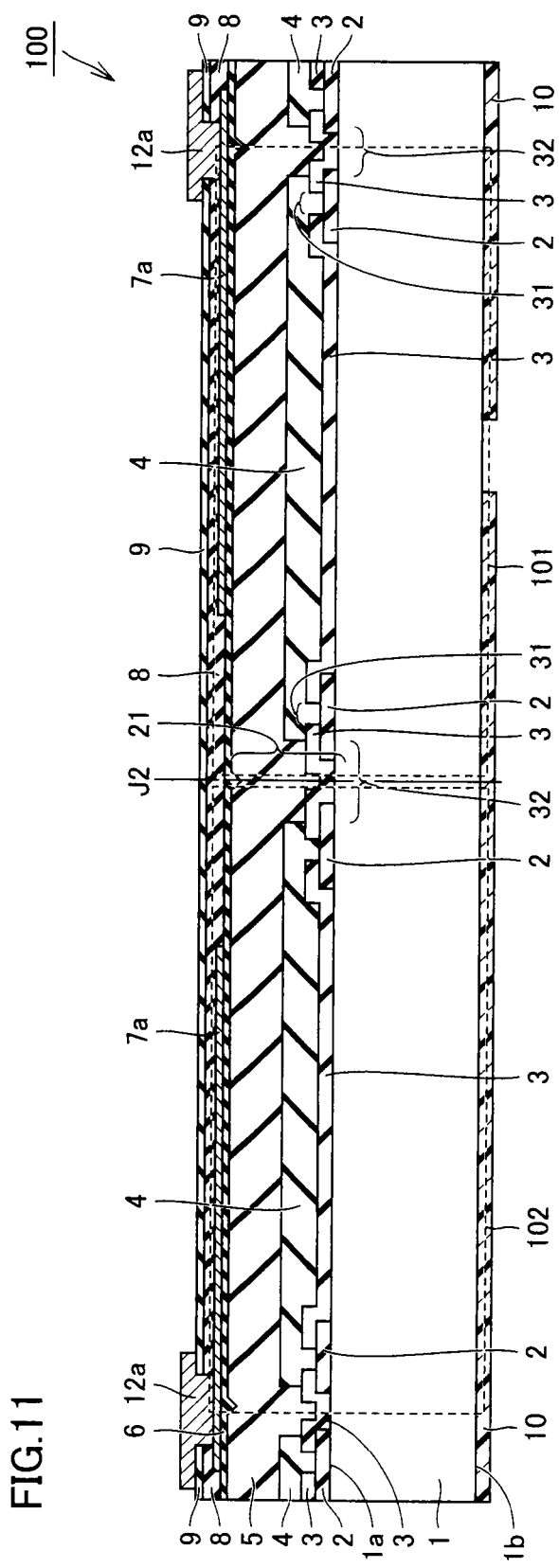
FIGS. 11 to 13 are schematic cross-sectional views showing in order the steps of manufacturing the semiconductor pressure sensor in accordance with Embodiment 2 of the present invention.
Figure 12:
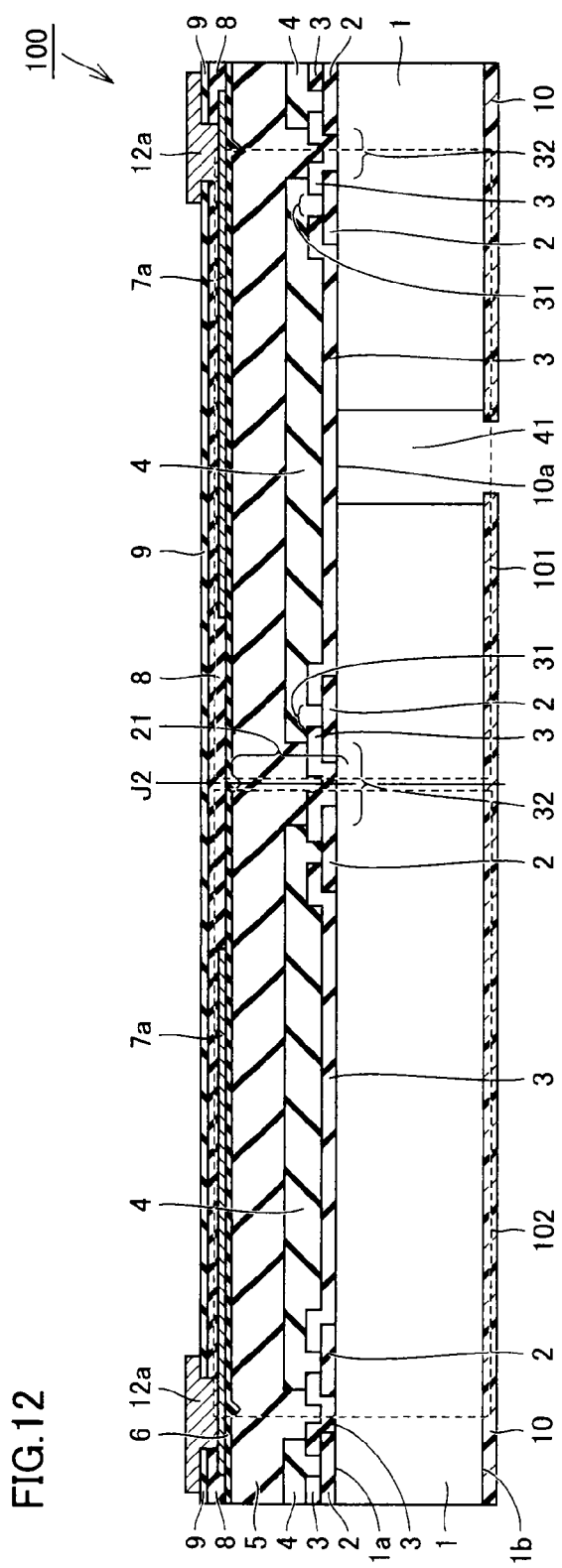
Figure 13:
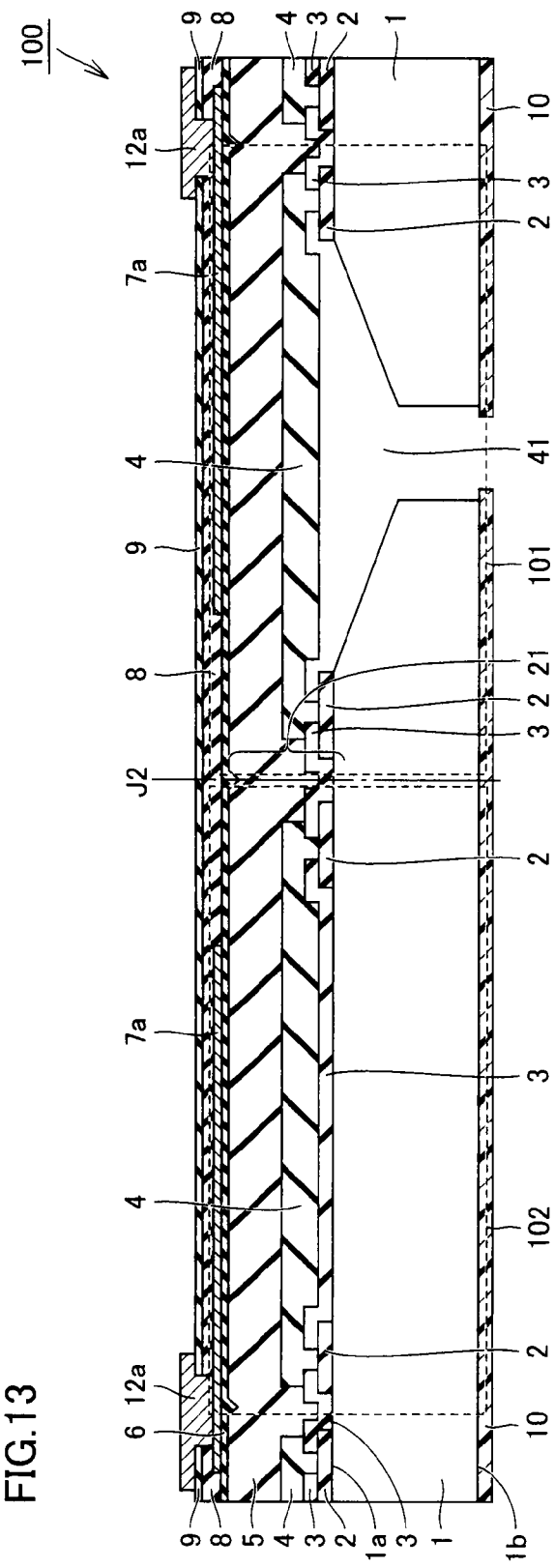

Referring to FIG. 11, a silicon substrate 1 of which second main surface 1b has crystal orientation of (110) is used. Thereafter, through the same process steps as in Embodiment 1, pattern formation on the side of first main surface 1a is completed. Thereafter, diaphragm etching mask 10 is formed to enable etching in the direction of <111> on the second main surface 1b. Referring to FIG. 12, wall surface of through hole 41 in silicon substrate 1 is processed to be vertical. As a result, diaphragm bottom surface 10a is formed. Referring to FIG. 13, by continuous etching, silicon substrate 1 and polysilicon sacrificial film 3 are side-etched.

Except for the points described above, the structure and manufacturing method in accordance with the present embodiment are the same as those of Embodiment 1 described above and, therefore, the same components are denoted by the same reference characters and description thereof will not be repeated.

From the foregoing, Embodiment 2 attains functions and effects similar to those of Embodiment 1.

Further, since the (110) plane of the second main surface 1b of silicon substrate 1 is etched in <111> direction, part of the wall surface of silicon substrate 1 can be processed to be vertical. This prevents etching of silicon substrate 1 at active gauge resistance forming portion 101 from reaching dummy gauge resistance forming portion 102 for temperature compensation. As a result, the first diaphragm 25 at active gauge resistance forming portion 101 and the second diaphragm 26 at dummy gauge resistance forming portion 102 for temperature compensation can be formed with higher accuracy.

(Embodiment 3)

Embodiment 3 of the present invention differs from Embodiment 1 mainly in gauge resistance 7 and polysilicon interconnection 7a.

Figure 14:
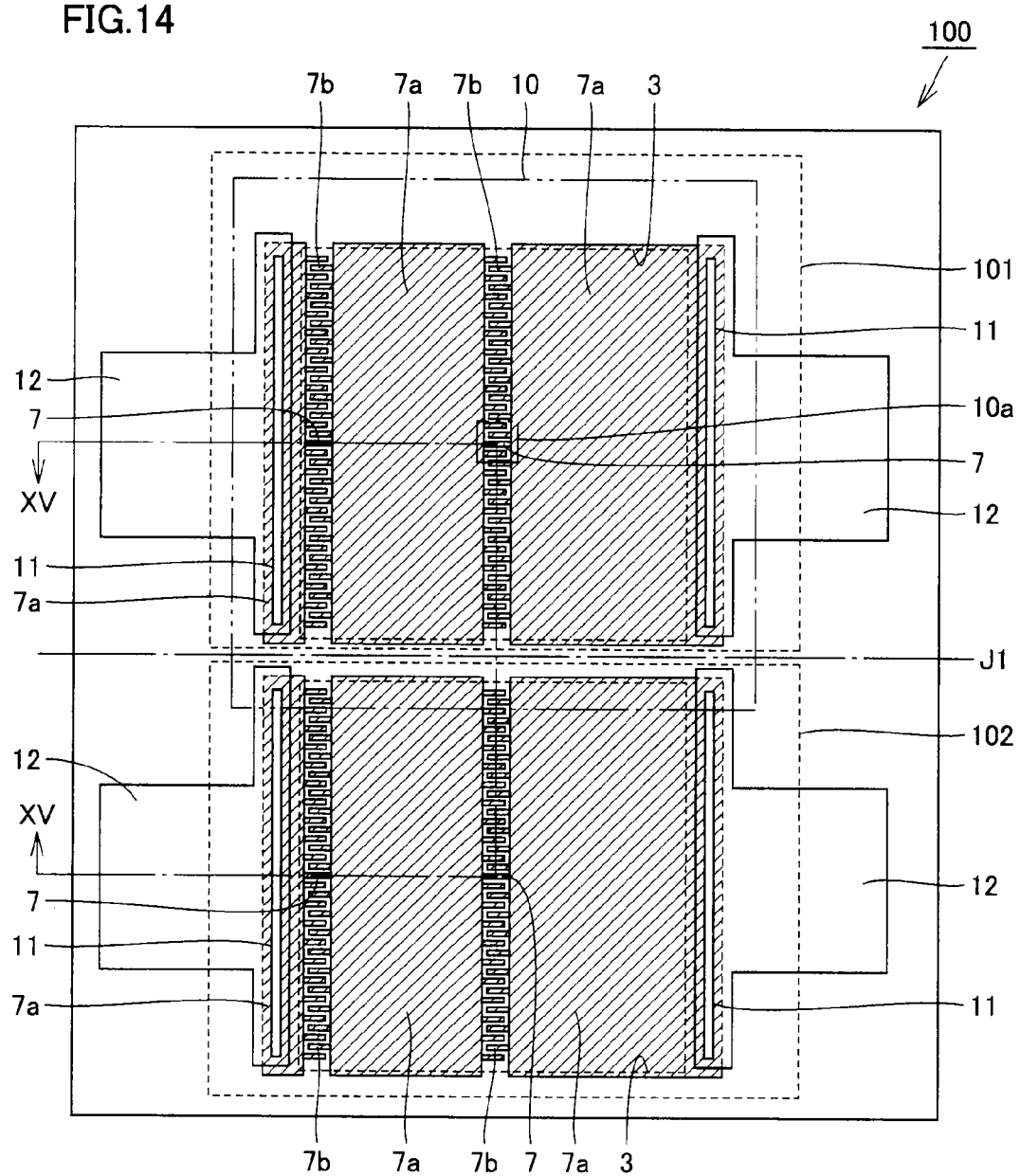
FIG. 14 is a schematic plan view of a semiconductor pressure sensor in accordance with Embodiment 3 of the present invention.

Referring to FIG. 14, a plurality of dummy polysilicon patterns (dummy patterns) 7b are formed in a direction intersecting longitudinal direction of gauge resistance 7. Dummy polysilicon patterns 7b are arranged to have the same width and space as the width and space of gauge resistance 7 in a plan view.

Figure 15:
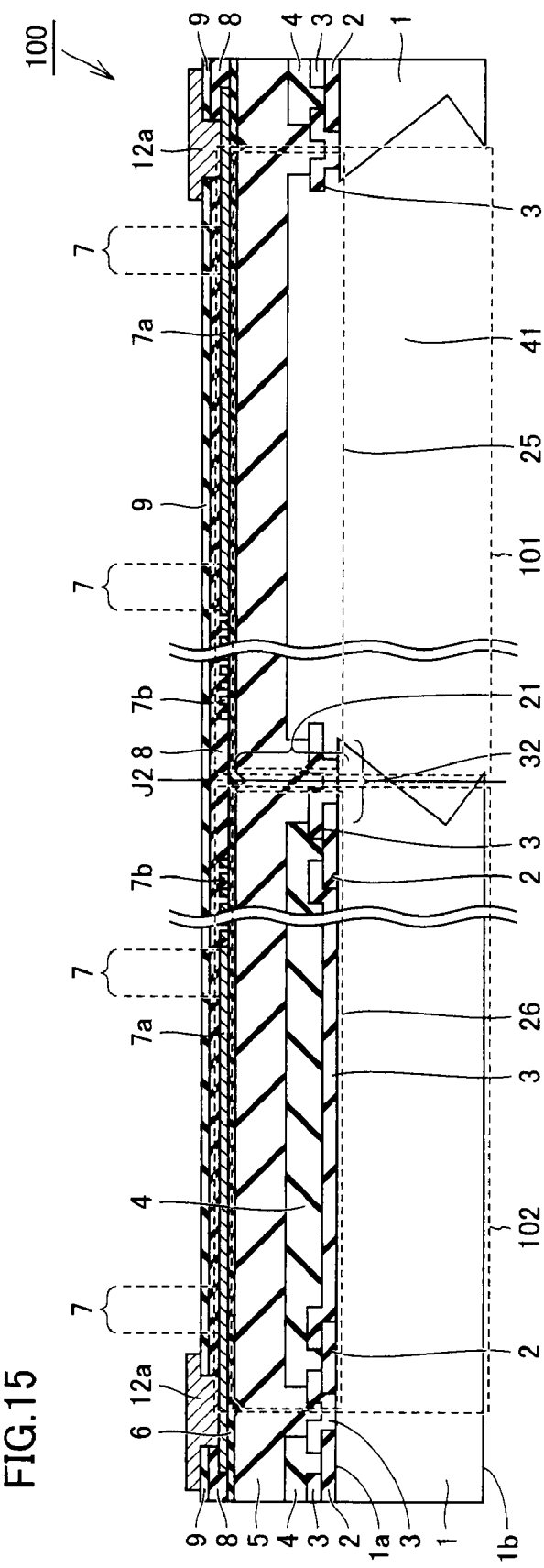
FIG. 15 is a schematic cross-sectional view taken along the line XV-XV of FIG. 14 of the semiconductor pressure sensor in accordance with Embodiment 3 of the present invention.

Referring to FIG. 15, dummy polysilicon pattern 7b formed of the same polysilicon film as polysilicon interconnection 7a is formed on the third insulating film 6. Further, gauge resistance 7 is formed next to dummy polysilicon pattern 7b.

As shown in FIG. 15, dummy polysilicon 7b is formed on third insulating film 6. Dummy polysilicon pattern 7b is formed, by way of example, by introducing an impurity such as B to an undoped polysilicon film.

Except for the points described above, the structure and manufacturing method in accordance with the present embodiment are the same as those of Embodiment 1 described above and, therefore, the same components are denoted by the same reference characters and description thereof will not be repeated.

From the foregoing, Embodiment 3 attains functions and effects similar to those of Embodiment 1.

Further, as the cross-sectional area of first and second gauge resistances 7 is made smaller, piezoresistance coefficient can be made larger. If the width of first and second gauge resistances 7 is reduced, however, influence of variation in resist width in photolithography and variation in etching increases. By providing a plurality of dummy polysilicon patterns 7b arranged to have the same width and space as first and second gauge resistances 7, patterning accuracy can be improved. Thus, variations mentioned above can be reduced.

By reducing the width and cross-sectional area of first and second gauge resistances 7, it becomes possible to increase piezoresistance coefficient of first and second gauge resistances 7. Accordingly, a semiconductor pressure sensor of higher accuracy can be provided.

Further, by reducing the variations mentioned above, it is possible to form the first and second gauge resistances 7 with higher accuracy.

The present invention can advantageously be applied particularly to a semiconductor pressure sensor capable of temperature compensation and to a method of manufacturing the same.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A semiconductor pressure sensor, comprising:
   a substrate;
   an active gauge resistance forming portion having a first diaphragm and a first gauge resistance formed on said substrate; and
   a dummy gauge resistance forming portion for temperature compensation having a second diaphragm and a second gauge resistance formed on said substrate; wherein
   said first diaphragm of said active gauge resistance forming portion and said second diaphragm of said dummy gauge resistance forming portion for temperature compensation are formed of a prescribed film, respectively;
   said prescribed film has an anchor portion extending to said substrate to be connected to said substrate; and
   said first and second diaphragms have mutually identical or symmetrical structures, and said first and second gauge resistances have mutually identical or symmetrical structures.

2. The semiconductor pressure sensor according to claim 1, wherein
   said substrate is formed of a silicon substrate;
   said silicon substrate has a first main surface on which said first and second diaphragms are formed and a second main surface opposite to said first main surface; and
   said second main surface of said silicon substrate has crystal orientation of plane.

3. The semiconductor pressure sensor according to claim 1, further comprising
   a dummy pattern having the same width as said first and second gauge resistances provided at said active gauge resistance forming portion and said dummy gauge resistance forming portion for temperature compensation.

4. The semiconductor pressure sensor according to claim 1, further comprising a through hole in said substrate at a location in communication with said first diaphragm and not in communication with said second diaphragm, whereby said first diaphragm is able to deform in response to a pressure change and said second diaphragm is not able to deform in response to a pressure change.

5. A method of manufacturing a semiconductor pressure sensor, comprising the steps of:
   forming, on a first main surface of a substrate having said first main surface and a second main surface opposite to each other, an insulating film having etching characteristic different from that of said substrate;
   forming an opening exposing said first main surface of said substrate in said insulating film, to surround a prescribed region of said insulating film from circumferential direction;
   forming a prescribed film to be diaphragms of both an active gauge resistance forming portion and a dummy gauge resistance forming portion for temperature compensation on said insulating film to fill said opening;

forming a prescribed etching mask on a region of said second main surface of said substrate;

etching said substrate through said etching mask and thereby forming a through hole to expose a surface of a portion of said insulating film positioned in said prescribed region; and removing said portion of said insulating film positioned in said prescribed region to expose the prescribed film to be said diaphragms through said through hole, and thereby forming said diaphragm at said active gauge resistance forming portion and not at said dummy gauge resistance forming portion.

6. The method of manufacturing a semiconductor pressure sensor according to claim 5, wherein said substrate is formed of a silicon substrate;

said second main surface of said silicon substrate has crystal orientation of (110) plane; and said step of forming said through hole from said second main surface has a step of vertically processing a part of a wall surface of said through hole.

7. The method of manufacturing a semiconductor pressure sensor according to claim 5, further comprising the step of forming a gauge resistance and a dummy pattern having the same width as said gauge resistance, at said active gauge resistance forming portion and said dummy gauge resistance forming portion for temperature compensation.

* * * * *